United States Patent
Herley (10) Patent No.: US 6,668,069 B1
(45) Date of Patent: Dec. 23, 2003

(54) METHOD AND SYSTEM FOR PROCESSING DIGITAL OBJECTS

(75) Inventor: Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/565,216

(22) Filed: May 4, 2000

(51) Int. Cl.[7] .................................................. G06K 9/00
(52) U.S. Cl. ........................ 382/100; 382/173; 345/838
(58) Field of Search ................................ 382/100, 173, 382/180, 219; 345/838

(56) References Cited

U.S. PATENT DOCUMENTS

| | | | | |
|---|---|---|---|---|
| 5,530,759 A | * | 6/1996 | Braudaway et al. | 380/54 |
| 5,572,433 A | * | 11/1996 | Falconer et al. | 700/127 |
| 5,686,960 A | * | 11/1997 | Sussman et al. | 348/218.1 |
| 5,717,940 A | * | 2/1998 | Peairs | 715/515 |
| 5,809,179 A | * | 9/1998 | Marimont et al. | 382/254 |
| 5,944,605 A | * | 8/1999 | Pajitnov | 463/9 |
| 5,991,816 A | * | 11/1999 | Percival et al. | 709/247 |
| 6,141,753 A | * | 10/2000 | Zhao et al. | 713/176 |

* cited by examiner

Primary Examiner—Leo Boudreau
Assistant Examiner—Tom Y. Lu
(74) Attorney, Agent, or Firm—Lee & Hayes, PLLC (57) ABSTRACT

Methods and systems of protecting digital objects are described. In one embodiment, a user is presented with a degraded version of a digital object. An exemplary degraded version might be a thumbnail version of a digital image. The user can then request portions of the degraded version of the object. Before a user is allowed to experience the requested portion, it is processed to perturb the portion in a manner that is generally imperceptible to the user. The user can request multiple portions and each portion is advantageously perturbed. In one embodiment, each of the multiple requested portions are perturbed differently so that if a user attempts to assemble the individual portions, they will not fit together. Each perturbation, however, when experienced individually by a user, is generally imperceptible to the user. Rule-based methods and systems for protecting digital objects by constraining a user's browsing behavior are also described.

78 Claims, 9 Drawing Sheets

METHOD AND SYSTEM FOR PROCESSING DIGITAL OBJECTS

TECHNICAL FIELD

This invention relates to methods and systems for processing digital objects. More particularly the invention concerns methods and systems for protecting digital objects.

BACKGROUND

The use of networked computers has greatly increased the volume of on line purchases and exchange of goods. For example, the Internet is capable of bringing sellers and buyers together in a manner that has never before been possible. This confluence of buyers and sellers has contributed greatly to an increase in the use and sale of digital goods. Digital goods are digital objects that can be transmitted from a seller to a buyer using a network media such as the Internet. For example, individuals, using appropriate browsing software, can browse sound bytes from a compact disc (CD) before making an online purchase of the CD. This gives the buyer an opportunity to determine whether they think they would like the purchased product. As another example, consider digital objects in the form of digital images such as pictures or photographs. There is a large market that exists for digital images that can be purchased on line. For example, a photographer may have his portfolio on line so that individuals interested in the photographs can browse them before making a purchase decision. Consider also a freelance news photographer that uses the online media to post a unique photograph associated with a newsworthy event. The online media can provide unprecedented quick access to a pool of potential purchasers that can help the photographer sell his photograph.

Yet, there are risks that are associated with providing unprotected access to digital goods. For example, it is not difficult for unscrupulous individuals to steal unprotected, or even protected digital goods that are accessible via the Internet. This happens everyday.

Figure 1:
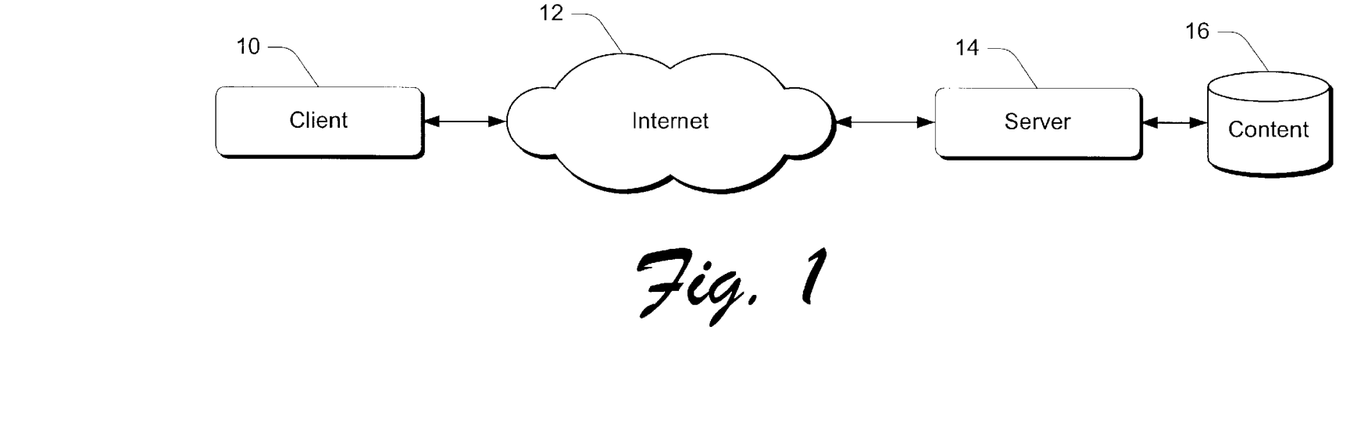
FIG. 1 is high level diagram of an exemplary network system in which one or more embodiments of the invention can be utilized.

FIG. 1 shows an exemplary network system that can support the online sale or exchange of digital objects. The system includes one or more clients 10, a network such as the Internet 12, one or more servers 14 and one or more object databases 16. Clients 10 are typically client computers that execute software that enables them to establish a communicative connection with the Internet. Exemplary software includes browsers such as Microsoft's Internet Explorer. Server 14 is a server computer that is configured to serve up information to client 10 over the Internet 12. The server 14 typically has one or more object databases 16 associated with it where digital objects are stored. To access a digital object, the client 10 may display a web page that has links to the digital objects. When a user clicks on a link with a mouse, the client 10 sends a message over the network to the server 14 that requests an object associated with the link. The server 14 retrieves the object from the object database 16 and sends it to the client 10 over the Internet 12. This is a typical client/server model.

One way that has evolved to protect digital goods is digital watermarking. A digital watermark is a mark of some type that is embedded in a digital object. The mark is generally imperceptible to a viewer, yet can identify the source of the digital object. In the FIG. 1 example, the objects that are stored in the object database 16 may have watermarks embedded therein. The result is that the object that is returned to the client 10 has a mark that identifies the source of the object. If, for some reason, the object is stolen (such as by illegal copying), the object's source can be determined at a later time by retrieving the watermark from the object. Watermarks do not, however, protect a digital object from being stolen. Rather, they simply enable an individual to identify the source of an object once it is stolen. In addition, watermarks have been subject to malicious and accidental attacks that can render their use ineffective. Once a watermark is discovered and removed, identifying the source of the object is likely impossible. Thus, watermarking is not, in most instances, the best way to protect a digital object.

With respect to digital images, another way of protecting the image is to provide only a thumbnail view of the image for browsing by interested individuals. The original image is withheld from the individual. A thumbnail view is a very small version of the original image. In the FIG. 1 example, when client 10 requests a digital image, the server 14 returns only a thumbnail view of the image to the client 10. While this might protect the original image, there are disadvantages to providing only a thumbnail view of an image. Specifically, because of the smaller size of the image, the quality is often times degraded. This means that the potential purchaser's viewing experience is not at all optimal.

Another alternative, and one which is at the other end of the spectrum, is to provide interested individuals full access to the full image of interest. In the FIG. 1 example, the server 14 would return a full unprotected image to the client 10. This is a poor solution because the full image can be easily stolen.

To date, there has not been a way to offer digital objects for sale over a medium such as the Internet, in a manner that optimizes the viewer's ability to browse or sample the object, yet provides a high level of protection for the object. This invention arose out of concerns associated with improving the manner in which digital objects can be offered for sale. Particularly, the invention arose out of concerns associated with providing a high level of digital object protection, yet enhancing a potential purchaser's viewing or sampling of the object of interest.

SUMMARY

Methods and systems of protecting digital objects are described. In one embodiment, a user is presented with a degraded version of a digital object. An exemplary degraded version might be a thumbnail version of a digital image. The user can then request portions of the degraded version of the object. Before a user is allowed to experience the requested portion, it is processed to perturb the portion in a manner that is generally imperceptible to the user. The user can request multiple portions and each portion is advantageously perturbed. In one embodiment, each of the multiple requested portions are perturbed differently so that if a user attempts to assemble the individual portions, they will not fit together. Each perturbation, however, when experienced individually by a user, is generally imperceptible to the user.

In one embodiment, perturbation of the digital images is accomplished by a software component called a perturbation module. The perturbation module can be embodied on a server computer that serves digital objects to client computers, or it can be embodied on client computers that are configured to enable a user to experience the digital objects. The described perturbation module comprises one or more deformations that can be used to perturb a digital object. In embodiments where the digital object comprises a digital image, the deformations can include scaling, translation, and angular orientation deformations to name just a few. In some embodiments, one or more of the deformations have parameters that can be varied to modify the nature of the deformation. These parameters can be used to vary each of the perturbations that are imparted to different portions of a digital image that might be requested by a user. Advantageously, the parameters can be randomly varied for each requested object portion so that no two object portions are compatibly deformed.

In another embodiment, digital objects are protected by constraining a user's ability to browse the objects. In the described embodiment, a rule-based approach provides a set of rules that govern a user's browsing behavior. In embodiments where the digital object comprises a digital image, the rules can limit the number of portions of any one image that can be browsed, the number of adjacent portions of the image that can be browsed or percentage of overlap between the portions, or the particular regions of the image that can be browsed. In addition, the rules are combinable, adjustable and extendable to provide a robust collection of rules that are tailored to suit the end user's preferences.

DETAILED DESCRIPTION

Exemplary Computer Environment

Figure 2:
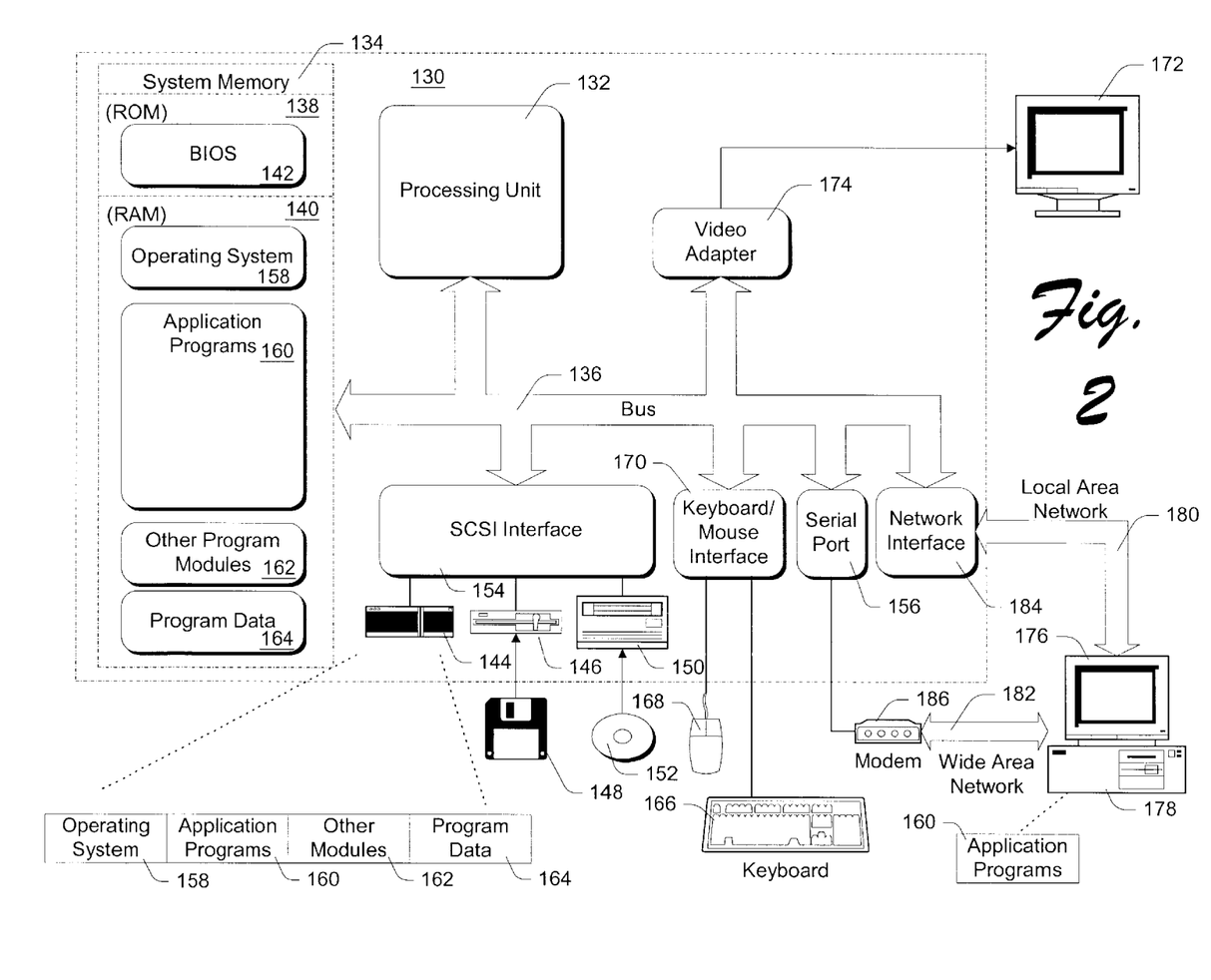
FIG. 2 is diagram of a computer system that can be used to implement one or more of a client computer or server computer in accordance with the described embodiments.

FIG. 2 shows but one example of a computer 130 that can be used to implement the described embodiments.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162 (such as one or more image synthesizing programs), and program data 164. A user may enter commands and information into computer 130 through input devices such as a keyboard 166 and a pointing device 168. Other input devices (not shown) may include a microphone, joystick, game pad, satellite dish, scanner, or the like. The input devices enable images to be digitized in a conventional manner, and used in accordance with the described embodiment. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Overview

The methods and systems that are described below enable owners of digital objects, such as digital images, to protect those objects while, at the same time, provide a user experience, e.g. browsing experience, that is not undesirably degraded. The inventive approaches strike a balance between object protection and user experience that has not heretofore been achievable.

In various embodiments, a user is presented with a degraded version of a digital object. The degraded version is a version that is not economically valuable to either of the owner or a user (e.g. potential purchaser) of the object. An exemplary degraded version might be a thumbnail version of a digital image. The user can then request portions of the degraded version of the object. Before a user is allowed to experience the requested portions, the portions are processed to perturb them in a manner that is generally imperceptible to the user. The user can request multiple portions and each portion is advantageously perturbed. Each of the multiple requested portions can be perturbed differently so that if a user attempts to assemble the individual perturbed portions, they will not fit together. Each perturbation, however, when experienced individually by a user, is generally imperceptible to the user. In embodiments where the digital object comprises a digital image, each requested image portion from an original digital image can be perturbed differently (e.g. through scaling, translation, angular orientation, illumination variation) so that the individual portions will not fit together. The nature of the perturbations are such that when each individual perturbed image portion is viewed separately, the perturbation is not perceptible or apparent. Yet, when an unscrupulous individual might attempt to reassemble the perturbed portions, doing so is computationally expensive and difficult because each of the perturbed image portions might have been perturbed differently.

In one embodiment, perturbation of the digital images is accomplished by a software component called a perturbation module. The perturbation module can be embodied on a server computer that serves digital objects to client computers, or it can be embodied on client computers that are configured to enable a user to experience the digital objects. The described perturbation module comprises one or more deformations that can be used to perturb a digital object. In embodiments where the digital object comprises a digital image, the deformations can include scaling, translation, and angular orientation deformations to name just a few. In some embodiments, one or more of the deformations have parameters that can be varied to modify the nature of the deformation. These parameters can be used to vary each of the perturbations that are imparted to different portions of a digital image that might be requested by a user. Advantageously, the parameters can be randomly varied for each requested object portion so that no two object portions are compatibly deformed.

In another embodiment, digital objects are protected by constraining a user's ability to browse the objects. In the described embodiment, a rule-based approach provides a set of rules that govern a user's browsing behavior. In embodiments where the digital object comprises a digital image, the rules can limit the number of portions of any one image that can be browsed, the number of adjacent portions of the image that can be browsed or percentage of overlap between the portions, or the particular regions of the image that can be browsed. In addition, the rules are combinable, adjustable and extendable to provide a robust collection of rules that are tailored to suit the end user's preferences.

Perturbation Module

Figure 3:
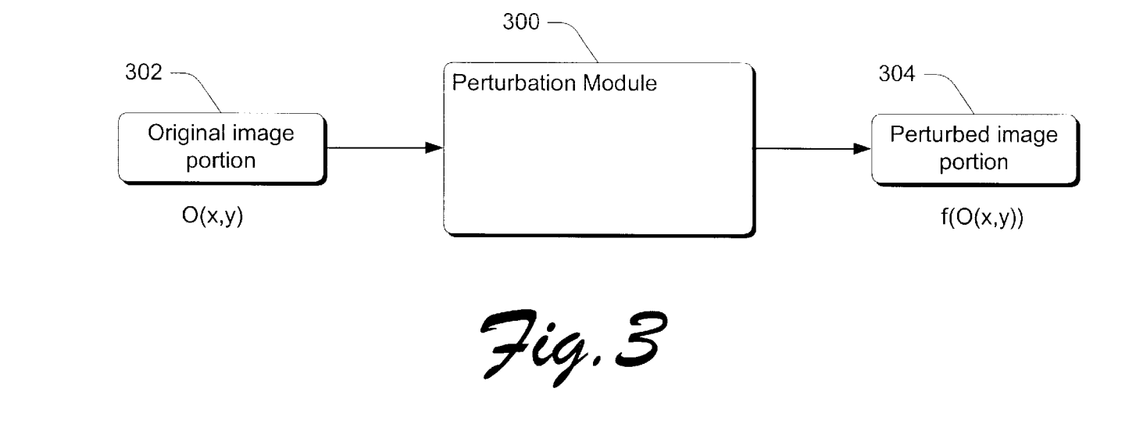
FIG. 3 is a block diagram of a perturbation module in accordance with one embodiment.

FIG. 3 shows an exemplary perturbation module 300 that is provided in accordance with the described embodiment. Perturbation module 300 can be implemented in any suitable hardware, software, firmware or combination thereof. In the described embodiment, the perturbation module 300 is a software module that executes to perturb a digital object in a manner that makes its reassembly at the client end very difficult. The perturbation that takes place advantageously takes place before a user can experience the digital object, e.g. before a user can view a digital image. The discussion below takes place in the context of a digital object that comprises a digital image. It is to be understood, however, that the principles discussed herein can have applicability to other digital objects such as audio objects, audio/visual objects and the like.

Principles upon which the described perturbation module 300 operates are as follows. When a user, via a client machine 10, desires to view or experience a digital image, such as image 302, possibly with a view toward purchasing the image, they are initially presented with a first version of the image. This first version is advantageously degraded in value so that it has minimal economic value to the owner of the image and a user of the image. The first version is presented to the user simply as a means of enabling the user to view a representation of an image. The degradation in value is such that if the image were to be stolen by the user, it would have little or no consequences to the owner of the image. As an example, a user could be presented with a thumbnail version of the original image. Alternately, the user could be presented with an original-sized image that is somehow degraded in quality (i.e. perhaps it is blurry or somehow distorted). The user is then given the opportunity to obtain and view portions of the degraded version of the image. The portions that are made available to the user are different versions of the image. These different versions can advantageously be generally un-degraded versions that allow a user to get a better user experience, i.e. view, of the portion. To do this, the user might click on a certain portion of the degraded version to view a small portion of the original image centered around that region. That is, by clicking on a particular portion of the degraded version of the image, the user's browser can indicate to an image server that it wants to view a particular defined un-degraded portion of the original image. When the server receives the message from the user's browser, it passes the requested image portion through the perturbation module 300 before it can be displayed for or sent to the user. Accordingly, what the user receives is a perturbed image portion 304 that is distorted somewhat from the portion of the image that was originally requested. The nature of the perturbations are such that, for each individual portion of the image that the user is allowed to view, the perturbation is very minor and not generally visually perceptible to the user. The perturbation preferably is performed to the entire image portion. That is, the perturbation module 300 is preferably configured to perturb the entire image portion, e.g. on a pixel-by-pixel basis.

In the described embodiment, each image portion that is requested by a user can be distorted differently so that the user receives differently distorted image portions that are very difficult to piece together. Consider an analogy of a puzzle, where the puzzle represents an original image that has many different puzzle pieces, each of which is analogous to an individual image portion 302. Each piece of the puzzle represents an image portion that can be requested for viewing by a user. Before a puzzle piece is returned to the user for viewing, however, it is distorted or perturbed slightly so that the shape, size, or image of the puzzle piece is altered. The distorted or perturbed puzzle piece corresponds to perturbed image portion 304. This processing can take place for each puzzle piece so that the collective distorted puzzle pieces are distorted differently and do not fit together and cannot easily be made to fit together. Yet, when each puzzle piece is viewed individually, it simply looks to the user as if it is a normal puzzle piece from the larger puzzle. For example, before returning a first of the puzzle pieces to a user, it might be enlarged by ten percent and shifted ever so slightly to the right. A second of the puzzle pieces might be reduced by 3 percent and shifted ever so slightly to the left. If the first and second puzzle pieces are adjacent one another in the original puzzle (and hence fit together in the original), it will be appreciated that they will not now fit together in the same way that they did before perturbation. When, however, the perturbed puzzle pieces are viewed individually, the perturbation is likely imperceptible to the eye. Thus, a user is given an opportunity to view individual quality versions of portions of the image that have been imperceptibly perturbed. The perturbations, however, make it extremely difficult to reassemble the collective perturbed image portions into an unperturbed original. Thus, the user viewing experience is enhanced while the owner's original image is protected.

Figure 4:
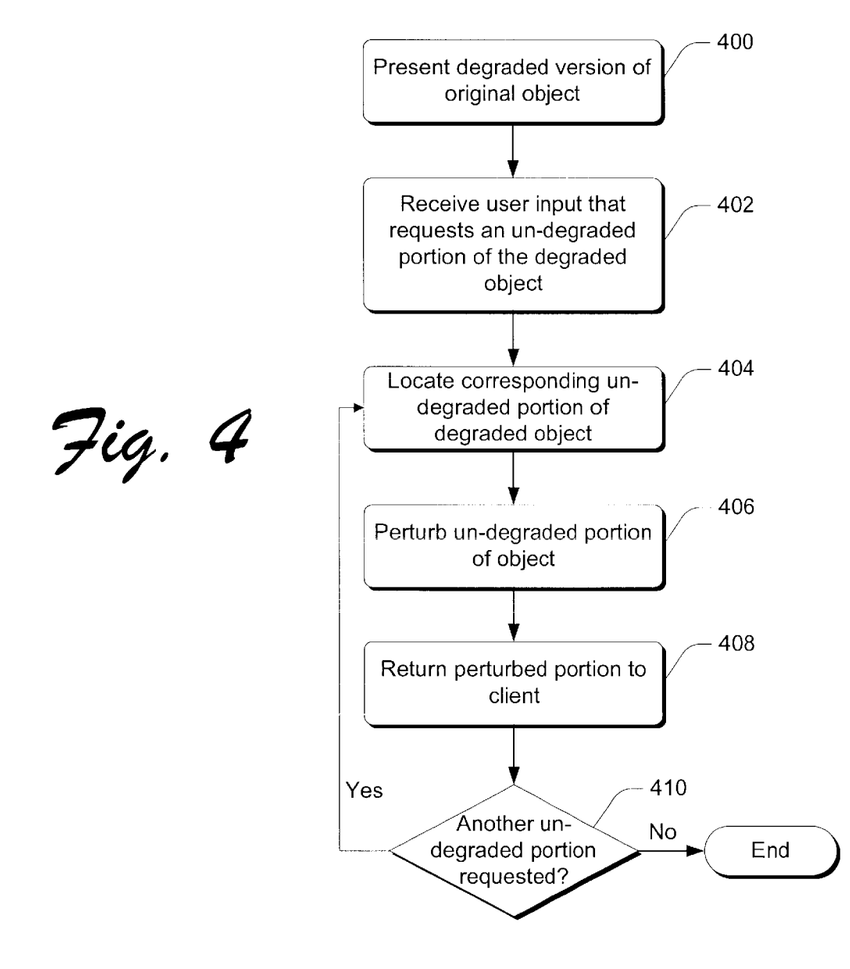
FIG. 4 is a flow diagram that describes steps in a method in accordance with one embodiment.

FIG. 4 is a flow diagram that describes steps in a method in accordance with the described embodiment. Step 400 presents a degraded version of an original object for a user to experience. In the above example, the original object is a digital image and the degraded version can be, for example, a thumbnail view or a distorted version of the original. It will be understood, however, that other objects could be used. In the described embodiment, this step can be implemented by the server 14 (FIG. 1) providing an image to the client 10 for viewing. Step 402 receives user input that requests an un-degraded portion of the degraded object version. The user input can be generated by the user clicking on a particular image portion that then requests an un-degraded image portion that is centered about a particular click point. This sends a request to the server 14. The server receives the request and locates the corresponding un-degraded object portion (step 404) that corresponds to the user's request. Having located the un-degraded object portion, the server submits the un-degraded object portion to the perturbation module 300 (FIG. 3) so that the object portion can be perturbed (step 406). Once the object portion has been perturbed, the server returns or sends the object portion to the client (step 408) thereby enabling the client to display the perturbed image portion for the user. Step 410 determines whether there are any additional requests to view un-degraded image portions. If there are additional requests, step 410 branches to step 404 and repeats the processing described above. In the described embodiment, the perturbation module can be configured to perturb each image portion differently (step 406) so that if a user collects many portions of an original image, it will be computationally difficult to reassemble the perturbed portions into an original image. If there are no additional requests, then step 410 ends.

Exemplary Perturbations

In the described embodiment, the original image portions can be perturbed by the perturbation module 300 through the use of a variety of deformations. Each of the deformations can be different and, accordingly, each deforms a different aspect of an original image portion. When all of the deformations are combined and utilized to deform or perturb a single original image portion, the resultant perturbed image portion is quite difficult to reconcile with other perturbed image portions. Advantageously, each of the original image portions can be deformed differently so that no two perturbed image portions are perturbed in exactly the same way.

Figure 5:
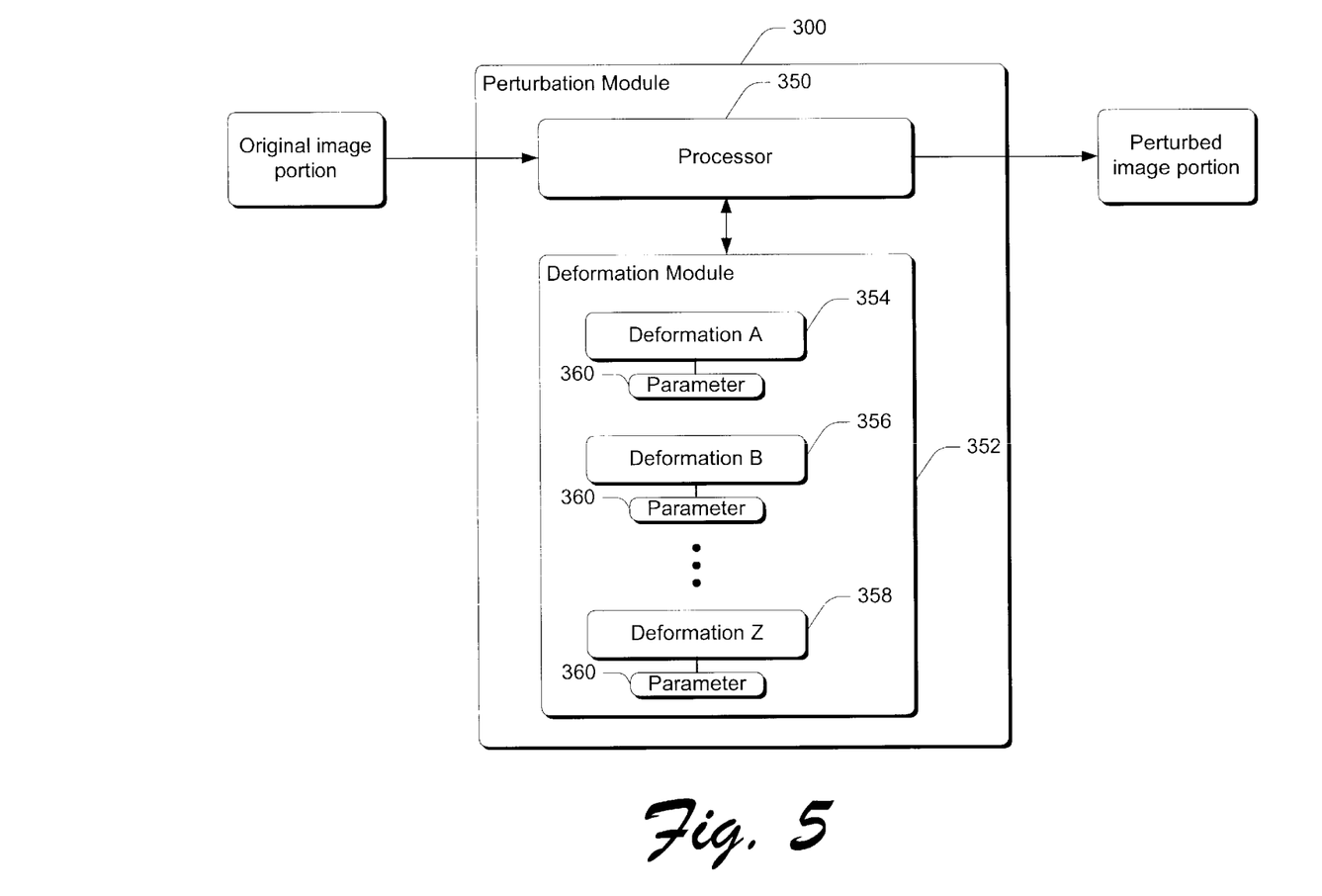
FIG. 5 is a block diagram of a perturbation module in accordance with one embodiment.

FIG. 5 shows an exemplary perturbation module 300 that is configured to perturb image portions are described above. In this particular example, the perturbation module includes a processor 350 that is configured to receive an unperturbed image portion and process the image portion to provide a perturbed image portion that can be displayed on a client machine. The perturbation module also includes a deformation module 352 that is utilized by the processor 350 to perturb the image portions. In this particular example, the deformation module 352 provides a plurality of deformations 354, 356, 358 that can be selected and used by the processor 350 to perturb an image. Any number and type of deformation can be utilized. One particularly advantageous feature of the described embodiment is that one or more of the deformations 354–358 comprise adjustable parameters 360 that can be adjusted so as to vary the amount of deformation. Variation of the parameters can take place in any suitable fashion. For example, the parameters for one or more of the deformations can be randomly varied for each image portion that is processed by the processor 350. This ensures that the chances of having two identically perturbed images portions is quite small. This is particularly the case when, for example, the parameters for all of the deformations are varied for each image portion that is processed.

Simple Example

As an example consider the following: A user executing a browser on their client machine pulls up a thumbnail view of an image of interest. Such a thumbnail view of an original image is diagrammatically shown in FIG. 6 at 600. The corresponding original image is shown at 602. The original image 602 might be maintained by a server computer that has access to the image. By clicking on particular portions of the thumbnail view 600, the user is able to view normal sized representations (albeit perturbed representations) of an area of interest. In this example, suppose a user clicks on a point 604 that can be represented as $O(x_0, y_0)$, which denotes a region of the original image centered at location $(x_0, y_0)$. For example, this region could be a square region of size N by N pixels. Instead of delivering $O(x_0, y_0)$ to the user, that image portion is processed by perturbation module 300 to provide a perturbed image portion $P(O(x_0, y_0), s_0, a_0, b_0)$, where so is a random scaling factor between 0.85 and 1.15, and $a_0$ and $b_0$ are randomly chosen horizontal and vertical offsets of a few pixels each. Accordingly, in this example, the deformations comprise a scaling deformation and an offset deformation. The adjustable parameter associated with the scaling factor is the scaling amount. The adjustable parameter associated with the offset deformation comprises the amount and/or direction of offset. From the point of view of the user's browser, the scaling and offset hardly matter at all. The user is given, as far as the user knows, the image portion that was requested. Yet, from the server's standpoint, the user was given an imperceptibly perturbed version of the original image portion. The result of the perturbed images is that the task of reconstructing the original image from perturbed images is considerably complex. In this case, an attacker will have to estimate each of the parameters a, b, and s for every single image portion that the attacker receives before he can piece together the original image. The attacker must estimate these parameters using a combination of $P(O(x_0,y_0), s_0, a_0, b_0)$, the thumbnail version of the image, and any other acquired perturbed regions $P(O(x_i,y_i), s_i, a_i, b_i)$, that overlap with $P(O(x_0,y_0), s_0, a_0, b_0)$. Since the thumbnail version is of a much lower quality than the original image, it will not be of much assistance in estimating the parameters $a_0$, $b_0$, and $s_0$. In fact it is highly likely that any estimations will necessarily be inaccurate. Estimating the perturbation parameters from overlapping regions $P(O(x_i,y_i), s_i, a_i, b_i)$, can be made much more computationally difficult by constraining that no two perturbed image portions overlap by more than some threshold amount. This constitutes but one exemplary way of complicating an attacker's task while not impacting the user's browsing freedom and/or quality. The above example constitutes but a simple case of two exemplary deformations and their adjustable parameters that can be used to protect an original image. Other deformations can, of course, be used as well.

Figure 6:
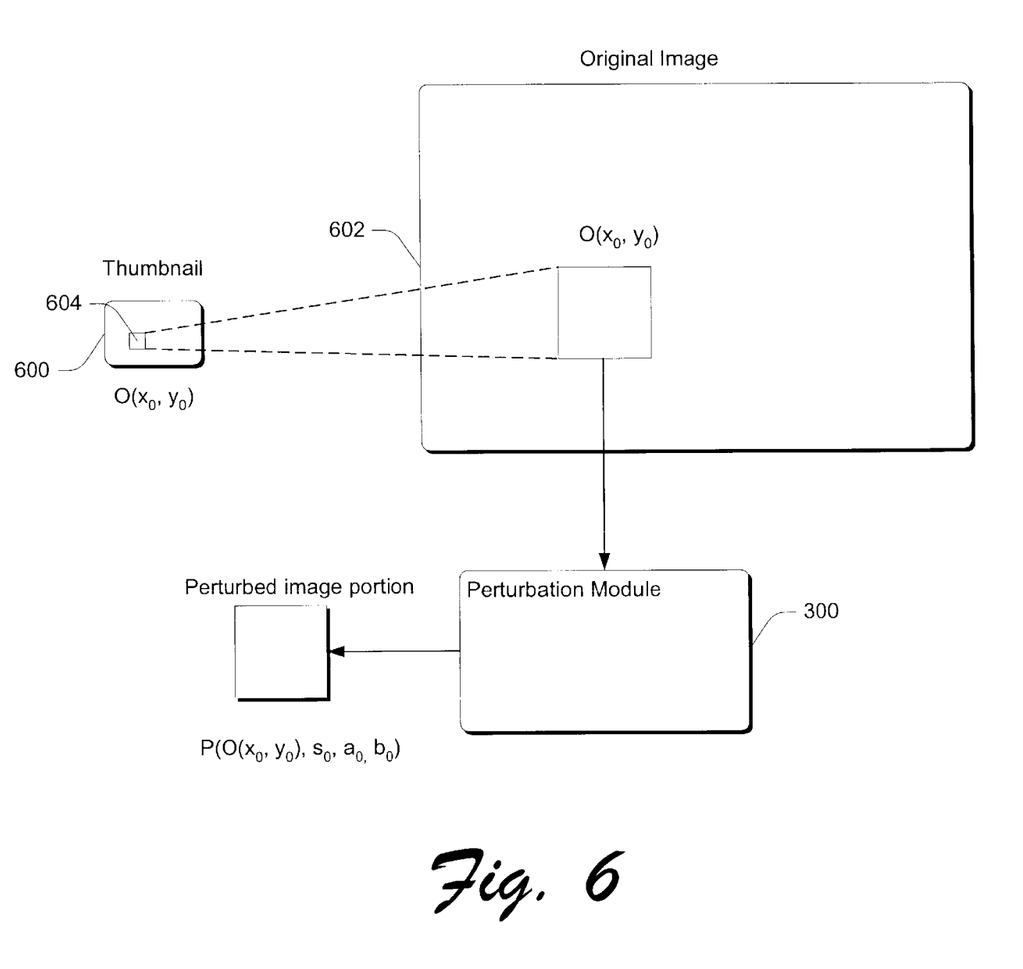
FIG. 6 is a conceptual diagram that assists in understanding one or more embodiments.

In a general case, this can be represented as follows: Let $O(x, y)$ represent a portion of an original image that is centered at $(x, y)$. Let $P(s, a, b, \alpha, \beta, \chi, \delta, \epsilon, \Phi, \gamma, \eta, \ldots)$ represent a perturbation function that is applied by the perturbation module 300 to each image portion that is requested by a user, where $s, a, b, \alpha, \beta, \chi, \delta, \epsilon, \Phi, \gamma, \eta$ represent different parameters for different deformations that can be utilized to perturb the requested image portions. Accordingly, when a client requests an image portion centered at $(x, y)$, instead of returning $O(x, y)$, the image portion $P(O(x,y), s, a, b, \alpha, \beta, \chi, \delta, \epsilon, \Phi, \gamma, \eta \ldots)$ is returned.

In selecting or defining a set of deformations to use in connection with the perturbation module 300, it has been found particularly advantageous to select deformations that are extremely difficult to invert absent information on the exact parameters used in the deformation. One can assume that, in some instances, an attacker may know the nature of the deformations, but not the parameters. Scaling is a good example: it is not difficult to rescale once the scaling factor s is known. But, accurately estimating s using only pieces that overlap, and the thumbnail view can be computationally expensive and error prone. Further, it is advantageous to select a set of deformations such that an attacker must attempt to estimate all of the parameters collectively, rather than being able to estimate them individually one by one. Thus, this forces the attacker to perform a large, non-separable multi-dimensional optimization problem for every single perturbed image portion.

An exemplary set of deformations is listed below. It should be understood that these are given for exemplary purposes only and are not intended to limit the scope of the claimed subject matter. Thus, other deformations can be used without departing from the spirit and scope of the invention. The exemplary deformations include, without limitation:

Scaling by randomly chosen factor in a range centered about 1.

Translation by random vertical and horizontal offsets.

Orientation by a randomly chosen small angle centered about zero.

Re-sampling on a grid which deviates slightly from a uniform grid.

Mapping intensity values to slightly modified values using lookup tables.

Alteration of the illumination gradient across the region of interest.

Figure 7:
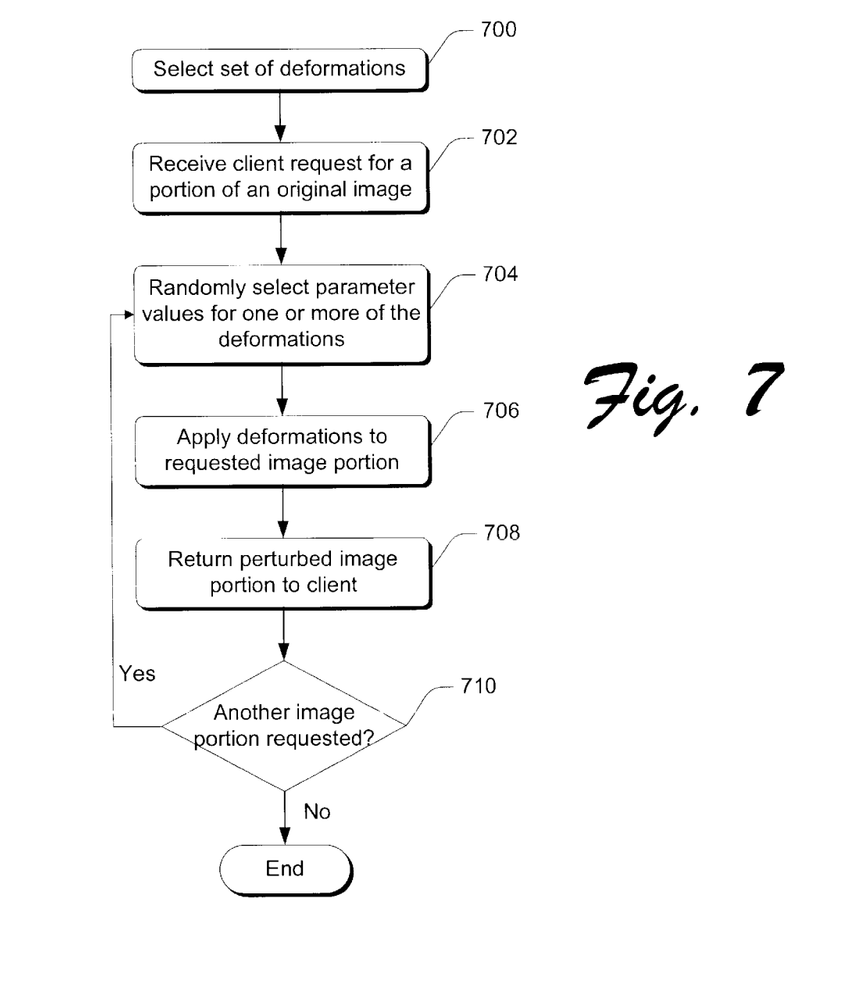
FIG. 7 is a flow diagram that describes steps in a method in accordance with one embodiment.

FIG. 7 is a flow diagram that shows steps in a method in accordance with the described embodiment. Step 700 selects a set of deformations that are to be used to perturb image portions that are requested by a user or client. Any suitable criteria can be used to select the deformations, with exemplary criteria given above. Any number and/or type of deformations can be used. Step 702 receives a client request for a portion of an original image. This step can be implemented by a user clicking on a particular image portion as described above. Step 704 randomly selects parameter values for one or more of the deformations that have been selected. This step can be done as the requests are received from the client. Alternately, this step can be done in advance of receiving the client request. Step 706 applies the deformations to the requested image portion. The step can be accomplished in advance of receiving the client request. In this case, the perturbed image portions might be resident in a memory location so that they can be quickly accessed by the server. Step 708 returns or sends the perturbed image portion to the client so that the user can view it. Step 710 determines whether there is an additional request for an original image portion. If so, step 710 branches to step 704. Advantageously, one or more of the parameters can be varied for the deformations so that no two perturbed image portions are perturbed in the same manner. If there are no additional requests for image portions requested, then the routine ends.

Client/Server Model

Figure 8:
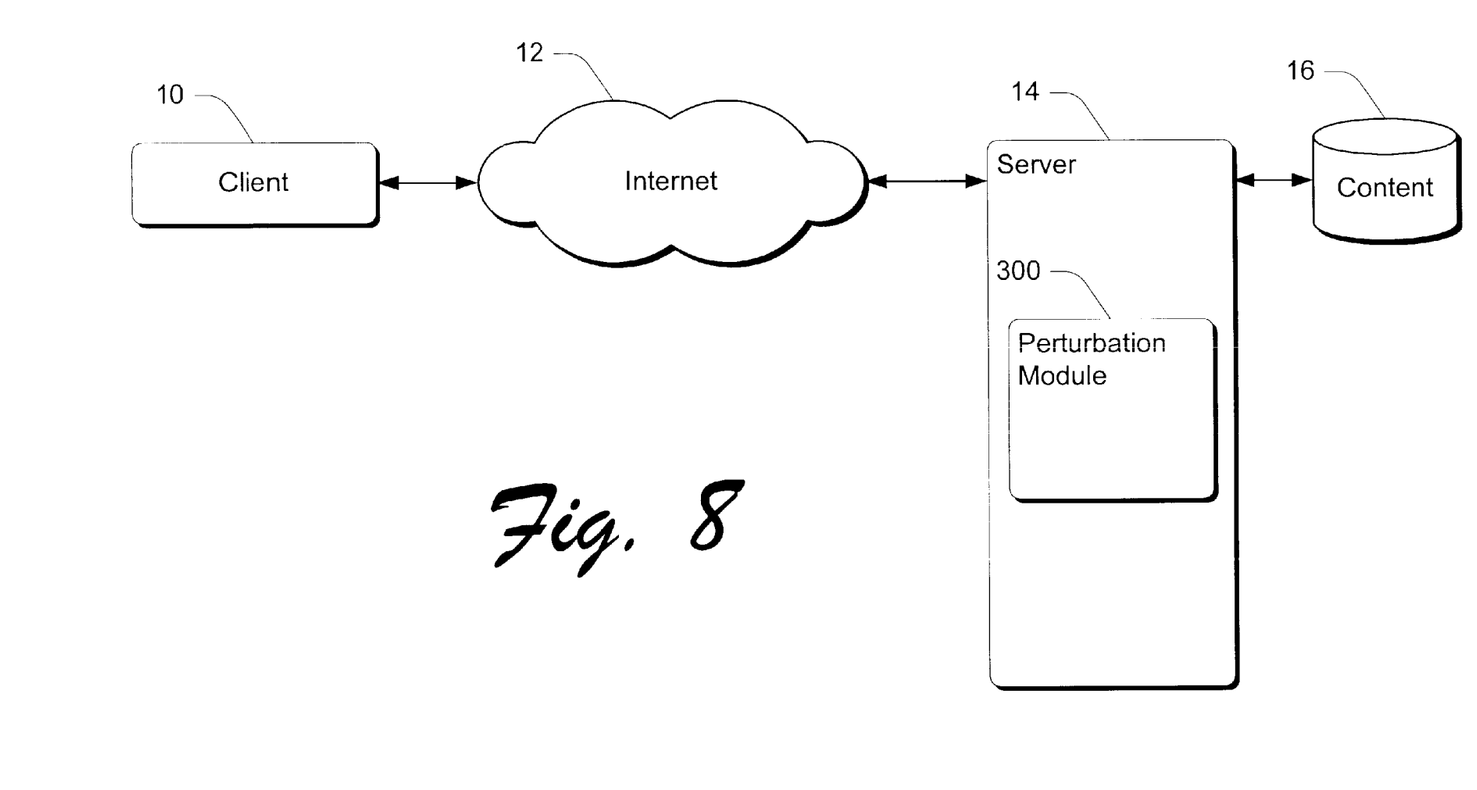
FIG. 8 is a block diagram that illustrates one embodiment of the present invention.

FIG. 8 shows one embodiment in which the perturbation module 300 is implemented at server 14. In this case, original images are located on the image database 16 and server 14 uses the perturbation module to perturb the image portions that are requested by the client 10 before they are sent to the client via the Internet. In this example, only the perturbed image portions are sent to the client. The original image remains accessible only to the server 14. This architecture or system is particularly advantageous from a security standpoint because the original image is accessible only to the server 14. This architecture can be slower than desirable in some instances because each time a client requests an image portion, the server may have to perform the perturbations. Thus, the delay in communication between the client and the server, as well as the computational load being borne by the server can result in a slow turnaround.

Client Model

Figure 9:
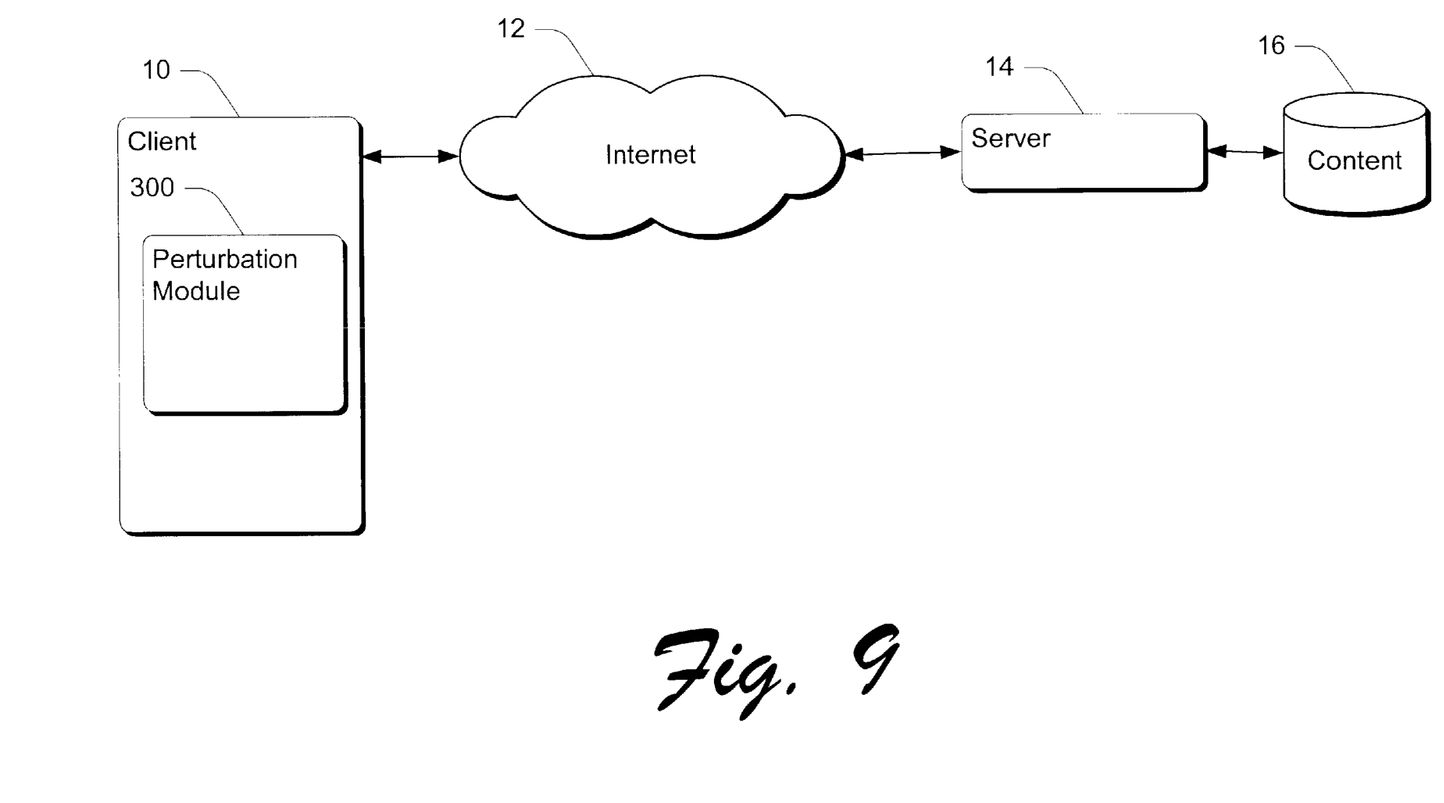
FIG. 9 is a block diagram that illustrates one embodiment of the present invention.

FIG. 9 shows a different embodiment in which the perturbation module 300 is implemented on the client. In this example, the perturbation module 300 can comprise part of the client's browsing software. The original image can be downloaded from the server 14 to the client 10. It is advantageous to scramble or encrypt the original image before providing it to the client so that the image is protected from attack. In this case, once the scrambled or encrypted image is provided to the client 10, the perturbation module 300 can calculate the perturbations using the image provided by the server 14 for each image portion that a user requests. It will be appreciated that the perturbation module 300 can be configured with unscrambling or decryption capabilities so that it can operate upon the original image. It is also advantageous to obfuscate or otherwise protect the perturbation module 300 when it is located on the client machine 10. This is to ensure that it is protected from attack. Any suitable obfuscation method can be employed.

This system is particularly advantageous because there is relatively no delay due to communication between the client and the server. That is, once the original image is downloaded to the client, the only delay is that which is imposed by the perturbation processing. One disadvantage of this system is that the perturbation module should be obfuscated to deter attacks. This can add to the complexity of the overall architecture.

Constraints on Freedom to Browse

In one embodiment, an original image can be protected by constraining an individual's freedom to browse a particular original image. In this example, an individual might be allowed to view unperturbed image portions, but their access to the portions is limited. This particular approach may be more suitable for situations where an original image is less susceptible to a collusion attack. For example, if a particular original image is a picture of a family at Disneyland, then it is highly unlikely that a large number of individuals will collude to attack and steal the image. However, if the original image is of a nature that many individuals might collude to steal the image, then this approach might not be optimal.

As an example, a collection of rules can be defined that are enforced whenever an individual attempts to browse an original image. In this example, assume that a user is provided with a thumbnail view of an image and they wish to view enlarged areas of the image. The rules ensure that an individual's opportunity to steal an original image is minimized. An exemplary set of rules are listed in the table below:

| | |
|---|---|
| Rule 1 | No two adjacent original image portions will be provided. |
| Rule 2 | No more than 5 original image portions can be browsed. |
| Rule 3 | No two original image portions can overlap by more than 50%. |
| Rule 4 | Requested original image portions can abut by no more than 30%. |
| Rule 5 | Only original image portions from Region X can be browsed. |

It will be appreciated that these rules constitute exemplary rules only. Accordingly, other rules could be utilized. It will also be appreciated that the rules can be combined or manipulated for further enhancing the security of the system. For example, by combining Rules 1 and 2, the user is allowed no more than 5 original image portions and the portions cannot be adjacent one another. In addition, the set of rules is extensible so that they can be adapted to meet a particular individual's specific needs. For example, an individual may add or remove one or more rules that are tailored to meet their own circumstances. Additionally, many of the rules can have adjustable parameters so that they can flexibly accommodate an individual's circumstances For example, an individual might change a parameter on one or more of the rules, e.g. by changing the "30%" in Rule 4 to "10%" to lessen the amount by which original image portions can abut. Accordingly, through the use of an extensible, adjustable rules set, individuals have a robust tool at their disposal for protecting original images. Of course, the rules set can be combined with the protection afforded by the perturbation module to further enhance the robustness of the protection.

Figure 10:
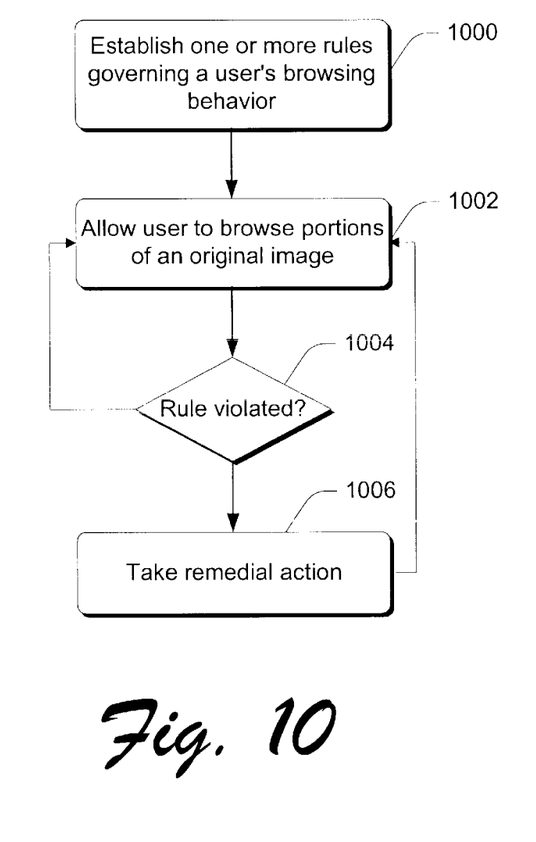
FIG. 10 is a flow diagram that describes steps in a method in accordance with one embodiment.

FIG. 10 is a flow diagram that describes steps in a method in accordance with one embodiment. The illustrated steps can be implemented in any suitable hardware, software, firmware, or combination thereof. For example, the steps can be implemented by a software module that is resident on a server that has access to an original image that is being browsed by a user. The software module ensures that the user's browsing activities conform to the defined rules.

Step 1000 establishes one or more rules that govern a user's browsing behavior. An exemplary rule set is described above. Step 1002 allows a user to browse portions of an original image. This step can be implemented by serving up unperturbed image portions of the original image. Step 1004 determines whether any of the rules have been violated by the user's browsing activities. If none of the rules have been violated, then step 1004 branches back to step 1002 and continues to monitor the user's browsing activities. If, on the other hand, one or more of the rules are violated, step 1006 implements a remedial action. Any suitable remedial action can be implemented. For example, if a user violates a browsing rule, they might be notified that the requested image portion is not available for viewing. Alternately, the last-displayed image portion might be displayed for them as a default. Step 1006 can branch back to step 1002 and allow a user to continue to browse the original image, as long as a rule is not violated.

Conclusion

The methods and systems described above provide various ways to protect digital objects, yet do not degrade a user's experience when browsing the object. Users are given an opportunity to individually experience imperceptibly perturbed object portions that, collectively, would be very difficult and computationally expensive to reassemble.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A perturbation module embodied on a computer-readable medium, the perturbation module being configured to:

receive a portion of a digital object responsive to a request from a user; and responsive to receiving the portion, perturb the entire digital object portion before it can be experienced by the user, the perturbed digital object being configured to be experienced by the user in a perturbed state that is imperceptible to the user, the perturbation module being configured to perturb different portions of the same digital object differently so that the portions cannot be assembled together in their perturbed state to form an unperturbed version of the digital object.

2. The perturbation module of claim 1, wherein the digital object comprises a digital image.

3. The perturbation module of claim 2, wherein all of the perturbations are different.

4. The perturbation module of claim 1, wherein the perturbation module comprises multiple deformations that can be applied to the digital object.

5. The perturbation module of claim 4, wherein at least one of the deformations comprises a parameter that is adjustable to vary the deformation.

6. The perturbation module of claim 4, wherein all of the deformations comprise a parameter that is adjustable to vary the associated deformation.

7. The perturbation module of claim 1 embodied on a server computer that is configured to access the digital object and provide the perturbed digital object to at least one client computer.

8. The perturbation module of claim 1 embodied on a client computer that is configured to enable a user to experience the perturbed digital object.

9. A computer-readable medium that embodies the perturbation module of claim 1.

10. A method of processing digital objects comprising:
presenting a first degraded version of a digital object to a client computer so that the digital object can be experienced by a user of the client computer;
receiving user input via the client computer that requests a different version of at least a portion of the degraded digital object;
perturbing, with a perturbation, a portion of the digital object that corresponds to the requested portion of the degraded digital object, said perturbation not comprising a watermark; and
sending the perturbed portion of the digital object to the client computer.

11. The method of claim 10, wherein the first version is degraded in value.

12. The method of claim 10, wherein the first version is degraded in quality.

13. The method of claim 10, wherein the digital object comprises a digital image and the first version is a thumbnail view of the digital image.

14. The method of claim 13, wherein the different version is an enlarged version of the digital object.

15. The method of claim 10, wherein the perturbing comprises using a plurality of different deformations on the object portion to perturb the object portion.

16. The method of claim 15, wherein the perturbing comprises randomly selecting at least one parameter associated with the different deformations and using the one parameter to implement the deformation.

17. The method of claim 15, wherein the perturbing comprises randomly selecting parameters associated with the different deformations and using the parameters to implement the deformations.

18. The method of claim 15, wherein the perturbing comprises randomly selecting parameters associated with all of the different deformations and using the parameters to implement all of the deformations.

19. The method of claim 10, wherein the receiving comprises receiving multiple requests for different portions of the digital object.

20. The method of claim 19, wherein the perturbing comprises perturbing each of the requested portions of the digital object.

21. The method of claim 19, wherein the perturbing comprises randomly perturbing each of the requested portions of the digital object.

22. The method of claim 19, wherein the perturbing comprises using a plurality of different deformations to perturb the requested portions.

23. The method of claim 22, wherein the perturbing comprises randomly selecting at least one parameter that is associated with at least one of the deformations and using the one parameter to implement the deformation.

24. One or more computer-readable media having computer-readable instructions thereon which, when executed by one or more computers implement the method of claim 10.

25. One or more computer-readable media having computer-readable instructions thereon which, when executed by one or more computers, cause the computers to:
receive a request from a user to view a portion of a digital image that is displayed for the user in a first version;
obtain a portion of the digital image that corresponds to the portion that is requested by the user; and
process the obtained portion of the digital image with a perturbation module that generally perturbs the digital image portion in a manner that is generally visually imperceptible to the user, said perturbation module being configured to perturb individual different portions of the same digital image differently such that the individual portions cannot be assembled together in their perturbed state to form an unperturbed original digital image.

26. The one or more computers of claim 25, wherein the instructions further cause the computers to send the perturbed digital image portion over a network for viewing on a client computer.

27. The one or more computers of claim 25, wherein the perturbation module is configured to perturb multiple portions of the digital image in a different manner.

28. The one or more computers of claim 25, wherein the instructions further cause the computers to display the perturbed digital image portion on a computer.

29. A method of processing digital images comprising:
defining a set of deformations that can be used to perturb a digital image;
receiving a client request for multiple portions of the digital image; and
perturbing the multiple portions of the digital image using the set of deformations, the deformations perturbing each image portion in a manner which, when viewed individually, is visually imperceptible, at least some individual portions of the digital image being perturbed differently such that the individual portions cannot be assembled together in their perturbed state to form an unperturbed original digital image.

30. The method of claim 29 further comprising sending the perturbed portions of the digital image to a computer for viewing.

31. The method of claim 29 further comprising varying at least one of the deformations for each image portion that is perturbed.

32. The method of claim 29 further comprising varying at least one of the deformations for each image portion that is perturbed, the varying comprising adjusting a parameter associated with the one deformation.

33. The method of claim 29 further comprising varying each of the deformations for each image portion that is perturbed.

34. The method of claim 29, wherein one of the deformations comprises a scaling deformation.

35. The method of claim 29, wherein one of the deformations comprises a translation deformation.

36. The method of claim 29, wherein one of the deformations comprises an angular orientation deformation.

37. The method of claim 29, wherein one of the deformations comprises an intensity value deformation.

38. The method of claim 29, wherein one of the deformations comprises an illumination gradient deformation.

39. The method of claim 29, wherein one of the deformations comprises one or more of the following: a scaling deformation, a translation deformation, an angular orientation deformation, an intensity value deformation, and an illumination gradient deformation.

40. The method of claim 29, wherein the deformations are selected so that they are difficult to invert without specific information concerning one or more parameters of the deformations.

41. One or more computer-readable media having computer-readable instructions thereon which, when executed by one or more computers implement the method of claim 29.

42. A method of processing digital images comprising:
receiving a client request for multiple portions of a digital image; and
applying a set of deformations to the multiple portions of the digital image sufficient to perturb the multiple portions in a manner which, when viewed individually is visually imperceptible, individual portions of the digital image being perturbed differently such that the individual portions cannot be assembled together in their perturbed state to form an unperturbed original digital image.

43. The method of claim 42, wherein each of the individual portions is perturbed differently.

44. The method of claim 42 further comprising displaying the multiple portions on a computer.

45. The method of claim 42 further comprising sending the multiple portions over a network to a client computer.

46. The method of claim 42 further comprising modifying at least one parameter associated with one of the deformations to provide a modified deformation.

47. The method of claim 42, wherein the set of deformations include one or more of the following: a scaling deformation, a translation deformation, an angular orientation deformation, an intensity value deformation, and an illumination gradient deformation.

48. A computer system comprising:
a server computer;
a database operably connected with the server computer, the database containing one or more digital images; and
a perturbation module executable by the server computer to perturb digital image portions;
the server computer being configured to:
receive requests for portions of the one or more digital images;
access the digital image portions in the database; and
process the digital image portions with the perturbation module to provide differently perturbed image portions which, when viewed individually, are perturbed in a manner that is visually imperceptible, the differently perturbed image portions being differently perturbed such that the individual portions cannot be assembled together in their perturbed state to form an unperturbed original digital image.

49. The computer system of claim 48, wherein the server computer is further configured to send the perturbed image portions to another computer over a network.

50. The computer system of claim 48, wherein the perturbation module comprises multiple deformations that can be applied to the digital image portions.

51. The computer system of claim 50, wherein the server computer is configured to vary the deformations that are applied to the digital image portions.

52. A computer system comprising:
a computer;
a perturbation module executable by the computer to perturb digital image portions;
the computer being configured to:
receive requests for portions of one or more digital images; and
process the digital image portions with the perturbation module to provide differently perturbed image portions which, when viewed individually, are perturbed in a manner that is visually imperceptible, the differently perturbed image portions being differently perturbed such that the individual portions cannot be assembled together in their perturbed state to form an unperturbed original digital image.

53. The computer system of claim 52, wherein the computer is further configured to:
receive an original digital image;
store the digital image in memory that is associated with the computer; and
access the digital image responsive to receiving the requests.

54. The computer system of claim 53, wherein the original digital image is stored in the memory in a protected state.

55. The computer system of claim 52, wherein the perturbation module is obfuscated on the computer.

56. A method of on-line commerce comprising:
offering one or more digital images for sale via the Internet;
allowing a potential purchaser to browse degraded versions of the one or more digital images;
receiving a request from the potential purchaser for multiple portions of the one or more digital images;
perturbing the one or more digital image portions in a manner which, when viewed individually, is visually imperceptible, individual digital image portions being differently perturbed such that the individual portions cannot be assembled together in their perturbed state to form an unperturbed original digital image; and
enabling the potential purchaser to view the perturbed image portions.

57. The method of claim 56, wherein the degraded version comprises a thumbnail version of a digital image.

58. The method of claim 56, wherein said perturbing comprises performing at least one of: scaling, translating, angularly orienting, changing intensity values, and altering an illumination gradient of the digital image portions.

59. The method of claim 56, wherein said enabling comprises sending the perturbed image portions via the Internet to a client computer.

60. The method of claim 56, wherein said enabling comprises displaying the perturbed image portions on a computer.

61. One or more computer-readable media having computer-readable instructions thereon which, when executed by one or more computers implement the method of claim 56.

62. The method of claim 56, wherein said perturbing comprises perturbing each portion of the digital image differently.

63. The method of claim 56, wherein said perturbing comprises randomly perturbing each portion of the digital image.

64. The method of processing digital objects comprising:
presenting a first degraded version of a digital object to a client computer so that the digital object can be experienced by a user of the client computer;
receiving user input via the client computer that requests a different version of only a portion of the degraded digital object;
perturbing a portion of the digital object that corresponds to the requested portion of the degraded digital object, said perturbing comprising the capability to perturb different requested portions of the degraded version of the digital object differently so that the differently perturbed portions cannot be assembled together in their perturbed state to form an unperturbed version of the digital object; and sending the perturbed portion of the digital object to the client computer.

65. The method of claim 64, wherein the first version is degraded in value.

66. The method of claim 64, wherein the first version is degraded in quality.

67. The method of claim 64, wherein the digital object comprises a digital image and the first version is a thumbnail view of the digital image.

68. The method of claim 67, wherein the different version is an enlarged version of the digital object.

69. The method of claim 64, wherein the perturbing comprises using a plurality of different deformations on the object portion to perturb the object portion.

70. The method of claim 69, wherein the perturbing comprises randomly selecting at least one parameter associated with the different deformations and using the one parameter to implement the deformation.

71. The method of claim 69, wherein the perturbing comprises randomly selecting parameters associated with the different deformations and using the parameters to implement the deformations.

72. The method of claim 69, wherein the perturbing comprises randomly selecting parameters associated with all of the different deformations and using the parameters to implement all of the deformations.

73. The method of claim 64, wherein the receiving comprises receiving multiple requests for different portions of the digital object.

74. The method of claim 73, wherein the perturbing comprises perturbing each of the requested portions of the digital object.

75. The method of claim 73, wherein the perturbing comprises randomly perturbing each of the requested portions of the digital object.

76. The method of claim 73, wherein the perturbing comprises using a plurality of different deformations to perturb the requested portions.

77. The method of claim 76, wherein the perturbing comprises randomly selecting at least one parameter that is associated with at least one of the deformations and using the one parameter to implement the deformation.

78. One or more computer-readable media having computer-readable instructions thereon which, when executed by one or more computers implement the method of claim 64.

* * * * *